Patented May 5, 1925.

1,536,052

UNITED STATES PATENT OFFICE.

WALTER BADER AND WILLIAM ALEXANDER DICKIE, OF SPONDON, NEAR DERBY, ENGLAND, ASSIGNORS TO AMERICAN CELLULOSE AND CHEMICAL MANUFACTURING COMPANY LIMITED, A CORPORATION OF DELAWARE.

MANUFACTURE OF COMPOSITIONS OR PREPARATIONS WITH CELLULOSE DERIVATIVES.

No Drawing. Application filed February 14, 1923. Serial No. 619,013.

*To all whom it may concern:*

Be it known that we, WALTER BADER, a citizen of the Swiss Republic, and WILLIAM ALEXANDER DICKIE, a subject of the King of Great Britain, both of Spondon, near Derby, England, have invented certain new and useful Improvements in or Relating to the Manufacture of Compositions or Preparations with Cellulose Derivatives, of which the following is a specification.

This invention relates to the manufacture of plastic masses, films, varnishes, solutions or materials (all hereinafter included in the term compositions) having a basis of cellulose acetate.

For the manufacture of celluloid-like materials with cellulose acetate many substances have been proposed as plasticisers or so-called camphor substitutes. The qualities to be sought for this purpose are that the substance should be a good solvent for cellulose acetate and should impart thereto similar properties to those which camphor imparts to nitrocellulose in the manufacture of celluloid. Hitherto this object has not been very satisfactorily attained, as the celluloid-like materials made with the known plasticisers or camphor substitutes are often found to be too soft or too brittle and usually have not the same desirable properties as nitrocellulose celluloid.

It has now been found that 1.1.1.trichloro.2.methyl propanol (2) (trichloro tertiary butyl alcohol), which may easily be obtained by the condensation of acetone and chloroform, is an excellent solvent and plasticiser for cellulose acetate. This substance has a high boiling point (about 167° C.) and a high vapour tension at ordinary temperature; it is insoluble, or but very little soluble in water and has a melting point about 96°–97° C. It is soluble in numerous organic solvents, e. g. acetone, ethyl acetate, alcohol and chloroform. It yields a plastic, celluloid-like material which is remarkably elastic and tough, and closely approaches in its desirable properties to those of nitrocellulose celluloid.

By reason of its high chlorine content trichloro butyl alcohol is practically non-inflammable, and is, therefore, fit for use in the so-called "non-inflammable celluloids". Being a positive solvent of cellulose acetate with high solvent power, it allows the admixture along with it of considerable amounts of non-solvents of the cellulose acetate, without detriment to the product. Such admixtures are often desirable for conferring special properties to the celluloid-like material, e. g. suppleness or noninflammability, and bodies such as vegetable oils, in particular castor oil, triphenyl phosphate and so forth, may be used.

Volatile or other solvents or diluents, plasticisers, filling materials colouring matters or any other usual or suitable additions may of course be made.

The said trichloromethyl propanol body or other compounds having the properties referred to may likewise be employed with cellulose acetate in the manufacture of photographic or other films or sheets, or in dope or varnish solutions in order to improve the quality of the film or coating left after evaporation, and generally in the manufacture of plastic masses, solutions, compositions or preparations having a basis of cellulose acetate.

The following are some examples of the manner in which the invention may be carried out, it being understood that they are given only by way of illustration and may be varied widely.

*Example 1. Celluloid-like mass.*

100 parts of cellulose acetate and 43 parts of the trichloro tertiary butyl alcohol are kneaded together in the way usual for making celluloid.

*Example 2. Celluloid-like mass.*

100 parts of cellulose acetate, 30 parts of the trichlorotertiary butyl alcohol and about 10 parts of triphenyl phosphate are kneaded together in the way usual for making celluloid.

*Example 3. Celluloid-like mass.*

100 parts of cellulose acetate, 30 parts of the trichlorotertiary butyl alcohol and about 5 parts of castor oil are kneaded together in the way usual for making celluloid.

*Example 4. For a film.*

100 parts of cellulose acetate are dissolved in a mixture of 10 parts of trichlorotertiary butyl alcohol and 900 parts of acetone and the solution run in the usual way to form a film.

*Example 5. For a varnish.*

100 parts of cellulose acetate are dissolved in a mixture of 10 parts of trichlorotertiary butyl alcohol and 500 to 900 parts of acetone or methyl acetate.

Other proportions of the ingredients and other solvents may be used in any of the examples. It is also understood that other plasticisers may be used together with the trichlorotertiary butyl alcohol, and that filling materials, coloring matters or any other usual or suitable additions may be made, according to the class of plastic material or other product required.

What we claim and desire to secure by Letters Patent is:—

1. A process for the manufacture of compositions having a basis of cellulose acetate, characterised by the employment therein of 1.1.1.trichloro.2.methyl propanol (2) as a solvent or plasticising agent.

2. Compositions comprising cellulose acetate and 1.1.1.trichloro.2.methyl propanol (2) as a solvent or plasticising agent.

In testimony whereof we have hereunto subscribed our names.

WALTER BADER.
WILLIAM ALEXANDER DICKIE.